Reissued Jan. 5, 1926. Re. 16,240

UNITED STATES PATENT OFFICE.

CARL D. HOCKER, OF EAST ORANGE, NEW JERSEY, ASSIGNOR TO WESTERN ELECTRIC COMPANY, INCORPORATED, OF NEW YORK, N. Y., A CORPORATION OF NEW YORK.

COATING COMPOSITION.

No Drawing. Original No. 1,422,861, dated July 18, 1922, Serial No. 344,177, filed December 11, 1919. Application for reissue filed December 22, 1923. Serial No. 682,362.

*To all whom it may concern:*

Be it known that I, CARL D. HOCKER, a citizen of the United States, residing at East Orange, in the county of Essex, State of New Jersey, have invented certain new and useful Improvements in Coating Compositions, of which the following is a full, clear, concise, and exact description.

This invention relates to the production of suitable oleo-resinous compositions which may be employed as the base in the manufacture of varnishes, impregnating compounds, lacquers, enamels, japans, and the like. More particularly it has to do with the use of such coating when heat is applied thereto to facilitate the hardening thereof.

In enameling or japanning electrical conductors or other metallic surfaces for example, either for electrical insulation or atmospheric protection, many compounds composed of resinous or oily materials, or both combined with volatile solvents or vehicles have been used. The suitability of such compositions for this purpose depends in a large degree upon the time required to bake them on the article to be coated and upon the flexibility, hardness and continuity of the resultant enamel.

An object of the invention is to produce a liquid coating composition, which after application with the aid of heat, converts the prepared liquid coating composition into a semi-solid through chemical action; and with continued heating, such as usually applied to bake enamels and japans, forms a hard, firm, continuous and durable coating.

It has been found that such compositions may be formed by combining under the proper conditions a resin, such as Congo copal, shellac, Manila copal, etc., one or more free fatty acids and a polyacid alcohol such as glycerine. In carrying out the preparation of such a compound, the resin and free fatty acids are mixed in suitable proportions until, with the aid at heat, a uniform homogeneous mass is obtained. This condition having been arrived at, the polyacid alcohol is added and the temperature increased until the mass again becomes homogeneous. For example, if 150 parts of Congo copal are added to 500 parts of a mixture of free fatty acids such as is derived from a vegetable oil by the saponification thereof, 112½ parts of glycerine will be required to give the final product the desired consistency. When the mass has become cool, a thick syrupy liquid is obtained which contains about 20 per cent of its weight as copal glyceride in an ungelatinized but readily gelatinizable condition, a considerably larger proportion of vegetable oil in an ungelatinized but readily gelatinizable condition which has been formed from the vegetable oil fatty acids and a portion of the glycerine and polymerized by heat, and sufficient free fatty acid to delay the gelatinization of the copal glyceride and the vegetable oil. The copal glyceride, which is held in solution by the vegetable oil, is present in sufficient quantities to give a quick baking quality to the syrupy liquid.

The compound so produced possesses the property of gelatinizing upon the further application of heat without the addition of other substances. This feature in itself will widen the field of application of compositions prepared from the materials heretofore mentioned.

While the above method is sufficient to produce the desired result, it is somewhat expensive because of the large amount of free fatty acid and polyacid alcohol required. By substituting a vegetable oil, say castor oil, for example, for part of the glycerine and part of the acid, the cost of the material will be considerably decreased and the product will be identical for practical purposes with that produced in the afore-mentioned manner. In carrying out this process, which is the preferred method of producing the liquid coating composition, 150 parts of Congo copal are mixed with 100 parts of the free fatty acids, ricinoleic, dihydroxystearic and stearic, which are derivable from castor oil by saponification. The temperature having been raised until a homogeneous mass is obtained, 37½ parts of glycerine and 510 parts of castor oil are then added. The heating is then continued until a certain predetermined condition is attained in which the liquid coating composition contains approximately the same ingredients as those obtained by the method described above, the resin glyceride and the vegetable oil being in the above described ungelatinized but readily gelatinizable condition so that further heating will cause gelatinization.

Before such gelatinization is carried out however, the composition is applied to the surface which is to be coated. It is desirable, in some cases at least, to add organic solvents, such as kerosene and the like, in order to render the composition more liquid. When a smooth, uniform covering has been secured, heat is applied thereto in such a manner that a gradual thickening of the fluid coating takes place. The temperature is then increased until solidification occurs.

It is to be understood that although Congo copal, shellac, and Manila copal have been mentioned herein specifically, it is intended to include any resin which the property of forming a gelatinous product with a polyacid alcohol. In referring to vegetable oils or fatty oils, all oils which will, upon saponification yield one or more fatty acids are included. Some of the oils which have been used are: Chinese wood oil, corn oil, castor oil, linseed oil, soya bean oil, rapeseed oil, sesame oil, cotton-seed oil and peanut oil.

In order that it may be understood what acids are intended to be included as belonging to the fatty acid class, a word of explanation is considered necessary. Various textbooks which contain matter relating to the chemical composition of such substances, differ in their classification of the fatty acids. As used in this specification, the term "fatty acids" is considered to include any and all classes embraced by the following outline.

1. Acids of the acetic series, $C_nH_{2n}O_2$.
2. Acids of the oleic series, $C_nH_{2n-2}O_2$.
3. Acids of the series, $C_nH_{2n-4}O_2$, which includes the open chain and cyclic acids.
4. Acids of the linoleic series, $C_nH_{2n-6}O_2$.
5. Acids of the clupanodonic and the $C_nH_{2n-8}O_2$ series.
6. Hydroxylated and carboxylated acids of any of the above classes.

Acids belonging to one or more of the series enumerated above are contained in each of the common vegetable oils. It is preferable, of course, to use those acids which contain one or more double bonds and are thus readily polymerizable and to use the higher members of each series so that the acid will not volatilize at the temperatures at which the preliminary reactions are carried on.

What is claimed is:

1. A liquid coating composition resulting from a combination comprising glycerine, resin, and free fatty acid.

2. A liquid coating composition resulting from a combination comprising glycerine, resin, free fatty acid, and vegetable oil.

3. A liquid coating composition resulting from a combination comprising glycerine, Congo copal, free fatty acid and castor oil.

4. The process of making a liquid coating composition which comprises treating resin with free fatty acid, and combining glycerine with the product so formed.

5. The process of makng a liquid coating composition which comprises treating resin with free fatty acid, and combining glycerine and vegetable oil with the product so formed.

6. The process of making a liquid coating composition which comprises treating Congo copal with free fatty acid and combining glycerine and castor oil with the product so formed.

7. A liquid coating composition comprising castor oil heated to a point just before gelatinization would take place and approximately 20% of Congo copal glyceride.

8. A liquid coating composition comprising vegetable oil in an ungelatinized but readily gelatinizable condition, a resin ester of polyacid alcohol, and a substance capable of delaying the gelatinization of said oil and said ester with prolonged heating.

9. A liquid coating composition comprising vegetable oil in an ungelatinized but readily gelatinizable condition, a resin ester of polyacid alcohol in an ungelatinized but readily gelatinizable condition, and a substance capable of delaying the gelatinization of said oil and said ester with prolonged heating.

10. A liquid coating composition comprising a Congo copal glyceride, castor oil thickened by heating to a lesser extent than would be required to gelatinize it, and a substance to delay the gelatinization of said glyceride and said oil.

11. An enamel comprising the hardened product obtained by baking upon an article to be coated a mixture of a gelatinizable resin ester and gelatinizable vegetable oil both previously thickened to near the gelatinization stage by heating.

12. An enamel comprising the hardened product obtained by baking upon an article to be coated, a mixture of Congo copal glyceride and gelatinizable vegetable oil both previously thickened to near the gelatinization stage by heating.

13. An enamel comprising the hardened product obtained by heating Congo copal glyceride in the presence of castor oil.

14. The product obtained by heating Congo copal glyceride in the presence of castor oil.

15. The process of forming a liquid coating composition which comprises heating resin glyceride and vegetable oil in the presence of a substance which will delay the gelatinization thereof and continuing this heating until said glyceride and said oil are in a readily gelatinizable condition.

16. The process of coating articles which comprises heating a gelatinizable resin glyceride and gelatinizable vegetable oil to a condition approaching gelatinization, applying the resultant product to the article to be coated, and baking it thereon.

17. The process of coating articles which comprises heating gelatinizable vegetable oil, glycerine and resin capable of forming with said glycerine a gelatinizable resin glyceride, in the presence of a substance which will delay the gelatinization of the gelatinizable materials formed, applying the resultant product to the article and baking it thereon.

18. The process of coating metallic articles which comprises heating Congo copal, glycerine and castor oil in the presence of a substance which will delay the gelatinization of gelatinizable materials formed, applying the resultant product to the metallic article, and baking it thereon.

In witness whereof, I hereunto subscribe my name this 17th day of December, 1923.

CARL D. HOCKER.